United States Patent
Tsou et al.

[11] Patent Number: 6,137,630
[45] Date of Patent: *Oct. 24, 2000

[54] THIN-FILM MULTILAYER SYSTEMS FOR USE IN A HEAD-UP DISPLAY

[75] Inventors: Yi-Jen Tsou, Taipei; Fang-Chuan Ho, Hsinchu, both of Taiwan

[73] Assignee: Industrial Technology Research Institute, Hsinchu, Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 09/114,394

[22] Filed: Jul. 13, 1998

[51] Int. Cl.⁷ ............................... G02B 1/10; G02B 5/30
[52] U.S. Cl. ........................................... 359/586; 359/487
[58] Field of Search ..................... 359/487, 583, 359/586

[56] References Cited

U.S. PATENT DOCUMENTS

| | | | |
|---|---|---|---|
| 4,968,117 | 11/1990 | Chern et al. | 350/164 |
| 5,050,966 | 9/1991 | Berman | 359/38 |
| 5,162,928 | 11/1992 | Taniguchi et al. | 359/13 |
| 5,453,859 | 9/1995 | Sannohe et al. | 359/487 |
| 5,460,888 | 10/1995 | Hashimoto | 359/586 |
| 5,496,621 | 3/1996 | Makita et al. | 428/216 |
| 5,686,979 | 11/1997 | Weber | 359/487 |
| 5,825,542 | 10/1998 | Cobb, Jr. et al. | 359/487 |

*Primary Examiner*—Darren Schuberg
*Assistant Examiner*—Fayez Assaf
*Attorney, Agent, or Firm*—Harness, Dickey & Pierce, P.L.C.

[57] ABSTRACT

A thin-film multilayer system for use in a head-up display is provided, which comprises: A substrate; a plurality of dielectric layers having a high refractive index sequentially formed on the substrate; and a plurality of dielectric layers having a low refractive index formed alternately with the plurality of dielectric layers having a high refractive index. The thickness and ingredient of each of the plurality of dielectric layers having a high refractive index and the plurality of dielectric layers having a low refractive index are determined according to interference theory for all-dielectric thin-film multilayers to make the thin-film multilayer system able to polarize light and to display images in true color. Further, the ingredients of the thin-film multilayer system are dielectric materials that can endure wear and tear, chemicals, and environmental injuries. The thin-film multilayer system can be directly formed on the windshield of a vehicle, otherwise it can be formed on a substrate made of glass or plastic, and then adhered to the windshield.

9 Claims, 4 Drawing Sheets

THIN-FILM MULTILAYER SYSTEMS FOR USE IN A HEAD-UP DISPLAY

BACKGROUND OF THE INVENTION

1. Field of the Invention

The present invention relates to high color fidelity thin-film multilayer systems for use in head-up displays, and more particularly to a combiner of head-up displays, wherein the reflectance is independent of variance in wavelength throughout the visible light range.

2. Description of Prior Art

In order to prevent a driver from becoming unaware of traffic condition while looking at a dashboard, a head-up display is normally provided on the windshield of a vehicle to inform the driver of the conditions of the vehicle while providing a view outside the vehicle. Moreover, due to the increase of information provided to aid driving, such as traffic conditions and road maps, multi-color or full-color display facilitates identification of different information. Hence, the light source for a head-up display gradually moves toward full-color LCDs instead of conventional LEDs. Furthermore, the thin-film multilayer combiner coating system formed on the windshield should be operable at various wavelengths for display.

In the prior art, some methods for manufacturing thin-film multilayer systems have been developed. U.S. Pat. No. 4,968,117 disclosed a holographic multilayer system but this is only suitable for use with a monochromatic light source. U.S. Pat. No. 5,050,966 discloses a thin-film multilayer system utilizing cholesteric LC, which is suitable for use with a multicolor light source. However, it is very difficult to provide a full-color display because the LC components have to be adjusted corresponding to desired wavelengths. U.S. Pat. No. 5,162,928 provides a frequency-doubled multilayer system, which can only be used with a monochromatic light source. U.S. Pat. No. 5,496,621 provides an optical thin-film multilayer system that can be designed to meet the requirements of the color spectrum. It can provide a full-color display if appropriately designed.

In the prior art, metal film such as Al or Ag was used to fabricate an optical thin-film multilayer system to obtain reflectance less sensitive to the variance of wavelength and polarization. Yet the metal film possesses high absorptance, such that the transmittance cannot reach the maximum, that is, the value of (1-reflectance). On the other hand, as in U.S. Pat. No. 5,496,621, the thin-film multilayer system includes two oxide layers, which do not absorb light, and thus tend to vary the color being displayed with the variance of incident angle. Furthermore, the reflected light from the thin-film multilayer system for displaying the vehicle's conditions is not polarized, and thus cannot be increased without sacrificing the high transmittance of the light from outside the vehicle.

SUMMARY OF THE INVENTION

Accordingly, the object of the present invention is to provide thin-film multilayer systems for use in head-up displays in which the above-described problems are eliminated. The average transmittance is larger than 70% to satisfy the regulations when the thin-film multilayer system is used in a moving vehicle.

Another object of the present invention is to provide thin-film multilayer systems for use in head-up displays in which the s-polarization reflectance can be maximized and insensitive to wavelength variation.

Regarding the fabrication of thin-film multilayer systems for use in head-up displays according to this invention, at least two oxides having respectively a higher refractive index and a lower refractive index, and nearly no absorption of the incident light, must be provided. The thicknesses of the oxide layers are designed according to the interference theory for all-dielectric thin-film multilayer. Oxides having a higher refractive index and a lower refractive index are layered according to the designed thickness on each other, one by one.

As described above, the s-polarization reflectance of a thin-film multilayer system according to this invention can be maximized. Furthermore, the glare reflected into driver's eyes from the bright sunlight is normally s-polarized light. Therefore, the thin-film multilayer systems of this invention possess an anti-glare function.

Compared with the conventional multilayer systems, the thin-film multilayer systems of this invention can provide an unpolarized display in a vehicle with an intensity of reflected light increased from 15%~20% up to 20%~25%, or provide a display having linear polarization, such as LCD, with an intensity of reflected light increased from 15%~20% up to 40%~50%. As a result, display inside the vehicle would be clearer, thereby the power consumption of the display can be reduced.

The color of the image inside and outside the vehicle is not distorted because the transmittance for the incident unpolarized light and the reflectance of the s-polarized light have little variation with wavelength. Furthermore, by appropriately designing the thin-film multilayer system, one can achieve color bearing little relationship to the incident angle. That is a feature which a single- or double-layer system cannot achieve.

Moreover, since the absorption of the material used as thin-film multilayer is very low for visible light, there is almost no loss of incident light. Accordingly, the transmittance for incident light and the s-polarized light reflectance can be raised as much as possible. Furthermore, because the thin-film multilayer system is not made of metal, it is suitable for outdoor applications such as windshields of vehicles due to the wear and tear, chemical and environmental endurance of this thin-film multilayer system. The thin-film multilayers can be deposited on a plastic film, and then adhered onto the windshield of a vehicle.

The sunshield function provided on a windshield is generally achieved by burying metal films such as Al or Ag in the laminated windshield. This process results in undesirably complex fabricating procedure for the windshield. Thin-film multilayer systems of this invention, determined by properly designing the thickness and the refractive index of each layer, can also serve as a sunshield. In this case, the average transmittance need not be larger than 70%, but the s-polarized light reflectance should still be maximized to increase the contrast of the reflected light and the light transmitted directly from outside.

BRIEF DESCRIPTION OF THE DRAWINGS

The following detailed description, given by way of example and not intended to limit the invention solely to the embodiments described herein, will best be understood in conjunction with the accompanying drawings in which.

DETAILED DESCRIPTION OF THE PREFERRED EMBODIMENTS

Figure 1:
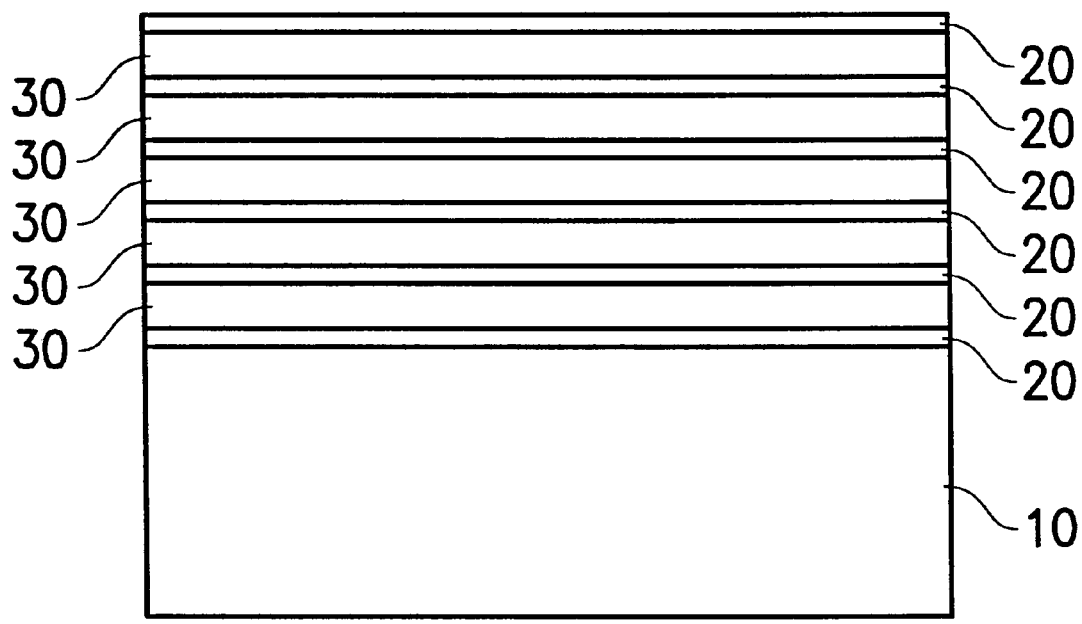
FIG. 1 is a diagram illustrating the structure of thin-film multilayer systems for use in head-up displays according to the present invention.

Referring to FIG. 1, a thin-film system for use in a head-up display according to the present invention comprises: A substrate 10 such as glass or plastic; a plurality of dielectric layers 20 having a high refractive index, such as $TiO_2$, which has a refractive index of around 2.25, sequentially formed on the substrate 10; and a plurality of dielectric layers 30 having relatively a low refractive index, such as $SiO_2$, which has a refractive index of around 1.45, alternately formed with the plurality of dielectric layers having a high refractive index 20.

The first embodiment is a thin-film multilayer system for use in a head-up display with an anti-glare function. Table 1 lists the thickness and the material of each layer of the thin-film multilayer system, which is designed according to the interference theory for all-dielectric thin-film multilayers.

TABLE 1

| Layer | Material | Thickness (nm) |
| --- | --- | --- |
| Substrate | Glass | |
| 1 | $TiO_2$ | 10.00 |
| 2 | $SiO_2$ | 41.12 |
| 3 | $TiO_2$ | 10.00 |
| 4 | $SiO_2$ | 28.32 |
| 5 | $TiO_2$ | 27.55 |
| 6 | $SiO_2$ | 42.64 |
| 7 | $TiO_2$ | 33.82 |
| 8 | $SiO_2$ | 64.53 |
| 9 | $TiO_2$ | 20.98 |
| 10 | $SiO_2$ | 76.61 |
| 11 | $TiO_2$ | 79.01 |
| External Medium | Air | |

When the thin-film multilayer system with the anti-glare function described above is operated at an incident angle of 45±12° color performance is as shown in the following Table 2.

TABLE 2

| | Reflected s-polarized light | Transmitted unpolarized light |
| --- | --- | --- |
| X | 0.334 ± 0.002 | 0.333 ± 0.001 |
| Y | 0.333 ± 0.002 | 0.333 ± 0.001 |
| Luminosity (%) | 38.42–56.44 | 68.57 ± 0.65 |

Figure 2:
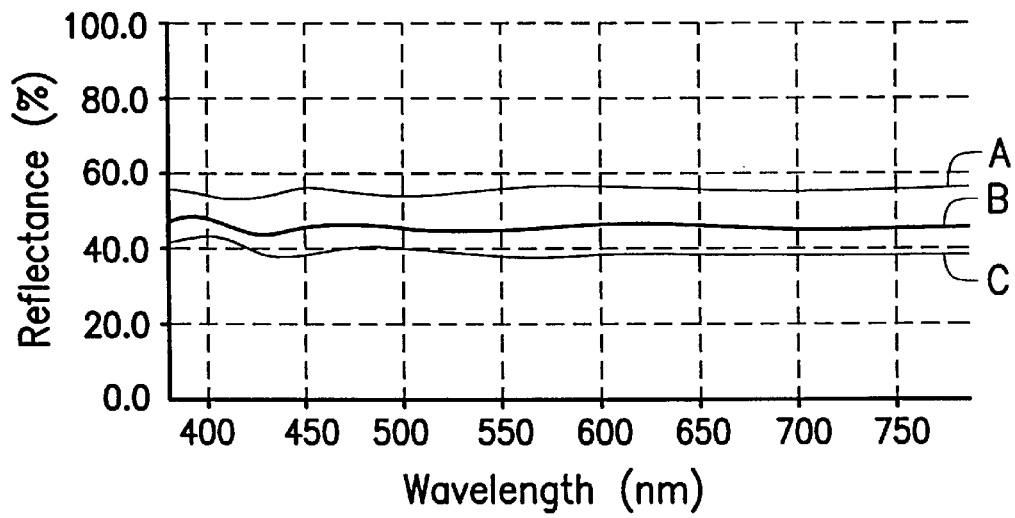
FIG. 2 illustrates the relationship between the incident light wavelength and the s-polarized light reflectance with different incident angles in the first embodiment of this invention.
Figure 3:
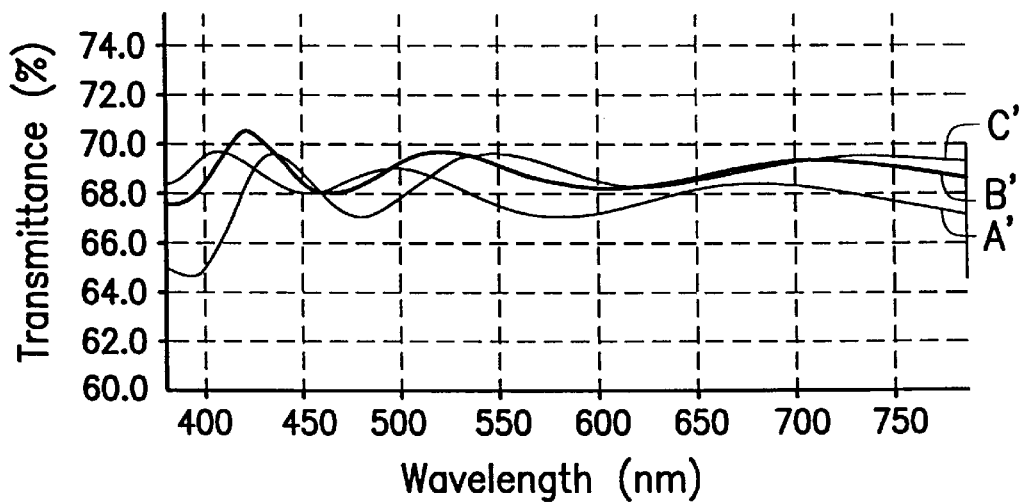
FIG. 3 illustrates the relationship between the incident light wavelength and the unpolarized light transmittance with different incident angles in the first embodiment of this invention.

The data shown in Table 2 are also illustrated in FIG. 2 and FIG. 3. FIG. 2 illustrates the relationship between the incident light wavelength and the s-polarized light reflectance with different incident angles in the first embodiment of this invention, in which Curve A results from an incident angle of 57°, Curve B results from an incident angle of 45°, and Curve C results from an incident angle of 33°. FIG. 3 illustrates the relationship between the incident light wavelength and the unpolarized light transmittance with different incident angles in the first embodiment of this invention, in which Curve A' results from an incident angle of 57°, Curve B' results from an incident angle of 45°, and Curve C' results from an incident angle of 33°.

The second embodiment is also a thin-film multilayer system for use in a head-up display with an anti-glare function. Table 3 lists the thickness and the material of each layer of the thin-film multilayer system, which is designed according to the interference theory for all-dielectric thin-film multilayers.

TABLE 3

| Layer | Material | Thickness (nm) |
| --- | --- | --- |
| Substrate | Glass | |
| 1 | $ZrO_2$ | 10.38 |
| 2 | $SiO_2$ | 51.04 |
| 3 | $ZrO_2$ | 32.00 |
| 4 | $SiO_2$ | 23.01 |
| 5 | $ZrO_2$ | 87.37 |
| 6 | $SiO_2$ | 21.92 |
| 7 | $ZrO_2$ | 28.22 |
| 8 | $SiO_2$ | 100.35 |
| 9 | $ZrO_2$ | 72.10 |
| External Medium | Air | |

When the thin-film multilayer system with the anti-glare function described above is operated at an incident angle of 45±12°, color performance is as shown in the following Table 4.

TABLE 4

| | Reflected s-polarized light | Transmitted unpolarized light |
| --- | --- | --- |
| X | 0.333 ± 0.000 | 0.334 ± 0.000 |
| Y | 0.333 ± 0.001 | 0.334 ± 0.001 |
| Luminosity (%) | 35.75–55.22 | 70.71 ± 1.19 |

Figure 4:
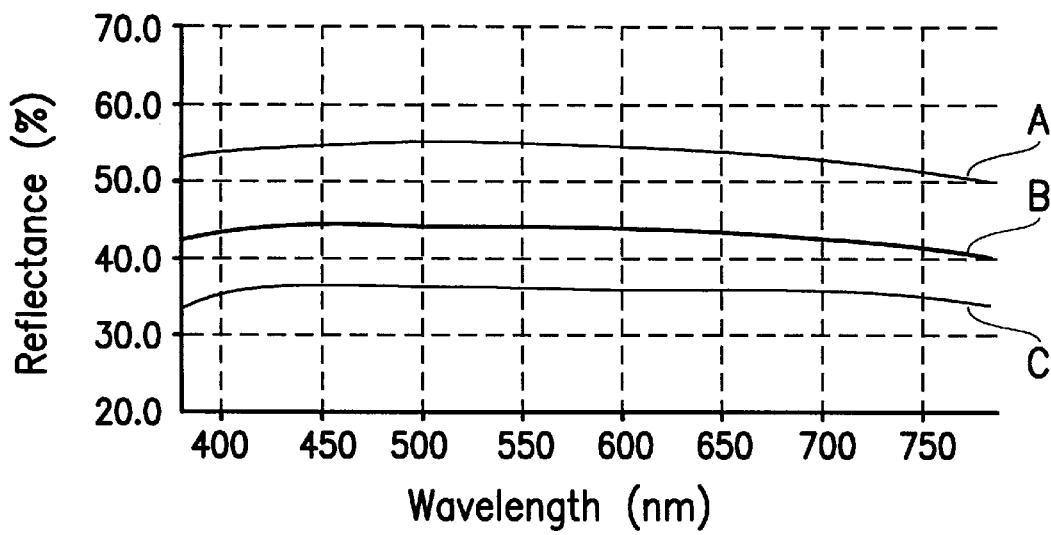
FIG. 4 illustrates the relationship between the incident light wavelength and the s-polarized light reflectance with different incident angles in the second embodiment of this invention.
Figure 5:
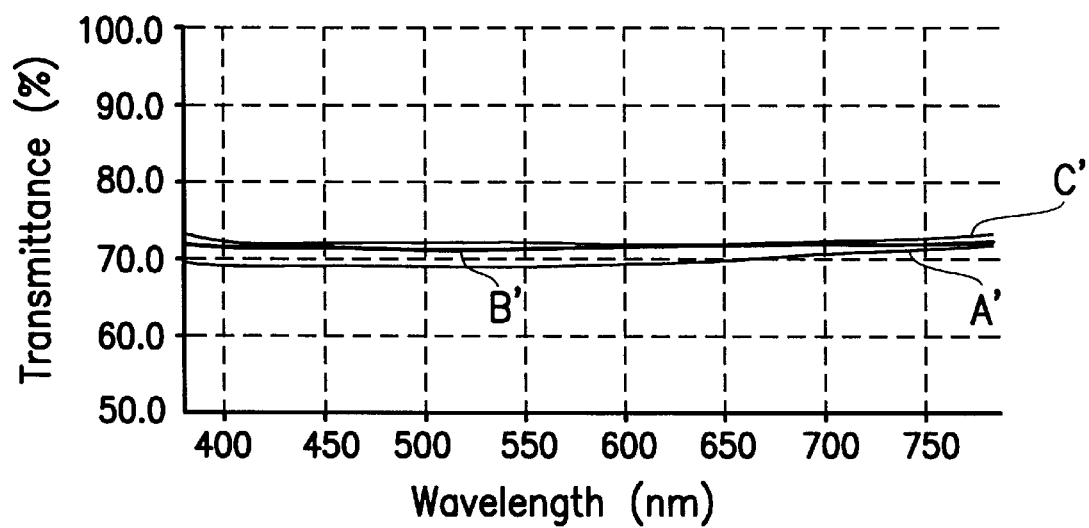
FIG. 5 illustrates the relationship between the incident light wavelength and the unpolarized light transmittance with different incident angles in the second embodiment of this invention.

The average transmittance of the unpolarized light can achieve 71.08±1.01% while the incident angle is 45±12°. The data shown in Table 4 are also illustrated in FIG. 4 and FIG. 5. FIG. 4 illustrates the relationship between the incident light wavelength and the s-polarized light reflectance with different incident angles in the second embodiment of this invention, in which Curve A results from an incident angle of 57°, Curve B results from an incident angle of 45°, and Curve C results from an incident angle of 33°. FIG. 5 illustrates the relationship between the incident light wavelength and the unpolarized light transmittance with different incident angles in the second embodiment of this invention, in which Curve A' results from an incident angle of 57°, Curve B' results from an incident angle of 45°, and Curve C' results from an incident angle of 33°.

The third embodiment is a thin-film multilayer system for use in a head-up display with a sunshield function. Table 5 lists the thickness and the material of each layer of the thin-film multilayer system.

TABLE 5

| Layer | Material | Thickness (nm) |
|---|---|---|
| Substrate | Glass | |
| 1 | $TiO_2$ | 54.77 |
| 2 | $SiO_2$ | 93.45 |
| 3 | $TiO_2$ | 53.10 |
| 4 | $SiO_2$ | 101.48 |
| 5 | $TiO_2$ | 56.97 |
| 6 | $SiO_2$ | 110.21 |
| 7 | $TiO_2$ | 101.19 |
| 8 | $SiO_2$ | 102.65 |
| 9 | $TiO_2$ | 99.76 |
| 10 | $SiO_2$ | 119.03 |
| 11 | $TiO_2$ | 102.90 |
| 12 | $SiO_2$ | 39.67 |
| External Medium | Air | |

When the thin-film multilayer system with a sunshield function described above is operated at an incident angle of 45±12°, the color performance is as shown in the following Table 6.

TABLE 6

| | Reflected s-polarized light | Transmitted unpolarized light |
|---|---|---|
| X | 0.338 ± 0.000 | 0.322 ± 0.005 |
| Y | 0.335 ± 0.001 | 0.330 ± 0.012 |
| Luminosity (%) | 82.73–92.00 | 24.43 ± 1.70 |

Figure 6:
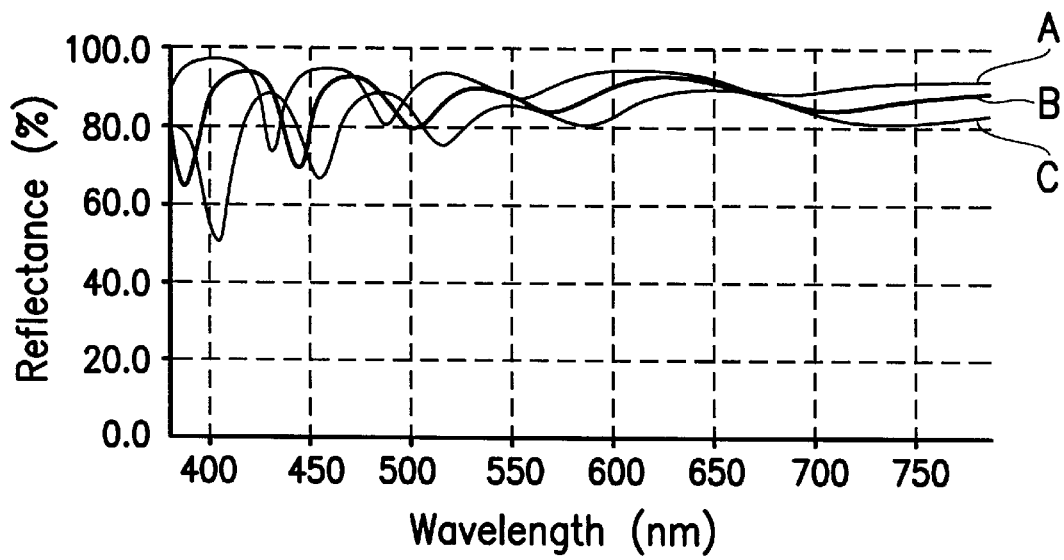
FIG. 6 illustrates the relationship between the incident light wavelength and the s-polarized light reflectance with different incident angles in the third embodiment of this invention.
Figure 7:
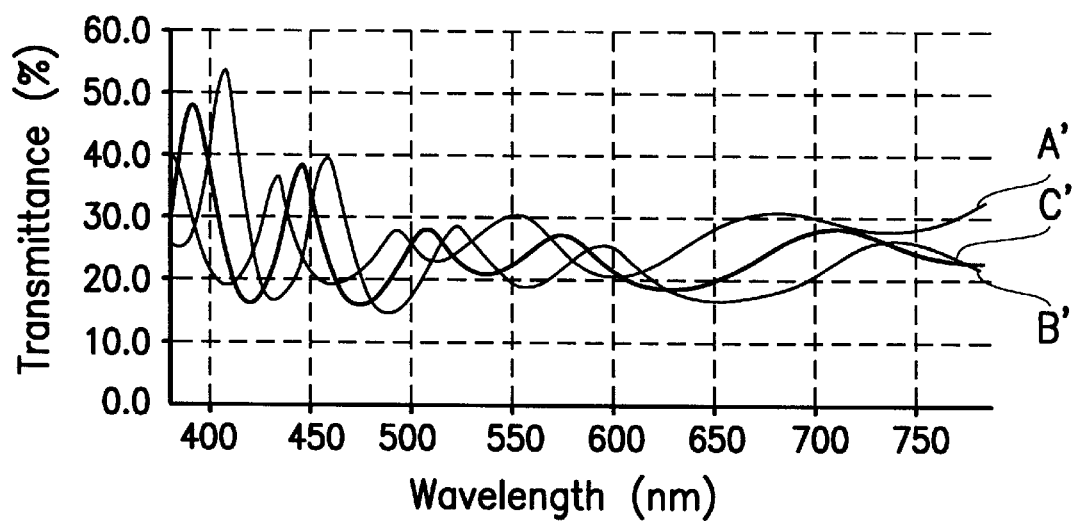
FIG. 7 illustrates the relationship between the incident light wavelength and the unpolarized light transmittance with different incident angles in the third embodiment of this invention.

The data shown in Table 6 are also illustrated in FIG. 6 and FIG. 7. FIG. 6 illustrates the relationship between the incident light wavelength and the s-polarized light reflectance with different incident angles, in which Curve A results from an incident angle of 57°, Curve B results from an incident angle of 45°, and Curve C results from an incident angle of 33°. FIG. 7 illustrates the relationship between the incident light wavelength and the unpolarized light transmittance with different incident angles, in which Curve A' results from an incident angle of 57°, Curve B' results from an incident angle of 45°, and Curve C' results from an incident angle of 33°.

According to Table 2, Table 4 and Table 6, it can be found that the thin-film multilayer systems for use in head-up displays can perform full-color display with no distortion. The thin-film multilayer systems of this invention can be formed on the windshield of vehicles. Otherwise the thin-film multilayer systems can be formed on a substrate of glass or plastic, and then adhered to the windshield.

In the above embodiments, about 10 layers of thin film were coated. However, the thin-film multilayer systems for use in head-up displays can be accomplished by anywhere from 3 to several tens of layers of thin film. Furthermore, the dielectric layer having high refractive index can include $TiO_2$, $Ta_2O_5$ or $ZrO_2$. The dielectric layer having relatively low refractive index can include $SiO_2$, $Al_2O_3$ or $B_2O_3$, etc.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiments, those alternatives, which have been discussed above, and all equivalents thereto.

What is claimed is:

1. A thin-film multilayer system for use in a head-up display comprising:

a substrate;

a plurality of first oxide layers having a high refractive index sequentially formed on the substrate; and a plurality of second oxide layers having a relatively low refractive index formed alternately with the plurality of first oxide layers in which the thickness and ingredient of each of said plurality of dielectric layers having a high refractive index and said plurality of dielectric layers having a low refractive index are determined so that a transmittance for an incident unpolarized light and a reflectance of an s-polarized light have little variation with the wavelength of the incident light, and images combined and directly displayed by the thin film multilayer system perform with true color fidelity.

2. A thin-film multilayer system for use in a head-up display as claimed in claim 1 wherein the first oxide layer and the second oxide layer substantially do not absorb visible light.

3. A thin-film multilayer system for use in a head-up display as claimed in claim 1 wherein s-polarized light is substantially reflected by the thin-film multilayer system.

4. A thin-film multilayer system for use in a head-up display as claimed in claim 1 wherein the number of the first oxide layers and second oxide layers is preferably in the range from 3 to several tens.

5. A thin-film multilayer system for use in a head-up display as claimed in claim 1 wherein the first oxide layer is made of dielectric oxides with refractive indices greater than 1.80 in the visible range of the spectrum.

6. A thin-film multilayer system for use in a head-up display as claimed in claim 1 wherein the second oxide layer is made of dielectric oxides with refractive indices less than 1.70 in the visible range of the spectrum.

7. A thin-film multilayer system for use in a head-up display as claimed in claim 1 wherein the order of the first oxide layer and the second oxide layer may be interchanged.

8. A thin-film multilayer system for use in a head-up display as claimed in claim 5 wherein the first oxide layer is made from a material selected from the group consisting of $TiO_2$, $Ta_2O_5$, and $ZrO_2$.

9. A thin-film multilayer system for use in a head-up display as claimed in claim 6 wherein the second oxide layer is made from a material selected from the group consisting of $SiO_2$, $Al_2O_3$, and $B_2O_3$.

* * * * *